United States Patent
Ahn et al.

(10) Patent No.: US 10,216,224 B2
(45) Date of Patent: Feb. 26, 2019

(54) DISPLAY APPARATUS

(71) Applicant: SAMSUNG DISPLAY CO., LTD., Yongin-si, Gyeonggi-do (KR)

(72) Inventors: Sungsang Ahn, Yongin-si (KR); Sangwol Lee, Yongin-si (KR); Taehyeog Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 329 days.

(21) Appl. No.: 15/004,798

(22) Filed: Jan. 22, 2016

(65) Prior Publication Data

US 2017/0010634 A1     Jan. 12, 2017

(30) Foreign Application Priority Data

Jul. 6, 2015 (KR) .................. 10-2015-0095852

(51) Int. Cl.
    *G09F 9/30*          (2006.01)
    *G06F 1/16*          (2006.01)
    *H04M 1/02*         (2006.01)
    *H05K 5/00*        (2006.01)

(52) U.S. Cl.
    CPC .......... *G06F 1/1626* (2013.01); *G06F 1/1652* (2013.01); *G09F 9/301* (2013.01); *H04M 1/0216* (2013.01); *H04M 1/0266* (2013.01); *H04M 1/0268* (2013.01); *H04M 2250/16* (2013.01); *H05K 5/0017* (2013.01)

(58) Field of Classification Search
None
See application file for complete search history.

(56) References Cited

U.S. PATENT DOCUMENTS

| | | | |
|---|---|---|---|
| 9,164,547 B1* | 10/2015 | Kwon | G06F 1/1656 |
| 2007/0218957 A1* | 9/2007 | Nishikawa | G06F 3/045 |
| | | | 455/566 |
| 2012/0002360 A1* | 1/2012 | Seo | G06F 1/1616 |
| | | | 361/679.01 |
| 2013/0076649 A1* | 3/2013 | Myers | H04M 1/0268 |
| | | | 345/173 |
| 2014/0042406 A1* | 2/2014 | Degner | H01L 27/326 |
| | | | 257/40 |
| 2014/0111954 A1* | 4/2014 | Lee | G06F 1/1641 |
| | | | 361/749 |
| 2015/0049428 A1 | 2/2015 | Lee et al. | |
| 2015/0062025 A1 | 3/2015 | Lee et al. | |

FOREIGN PATENT DOCUMENTS

| | | |
|---|---|---|
| KR | 10-1329946 B1 | 11/2013 |
| KR | 10-2014-0148176 A | 12/2014 |
| KR | 10-2015-0021167 A | 3/2015 |
| KR | 10-2015-0026537 A | 3/2015 |
| KR | 10-2015-0047356 A | 5/2015 |

* cited by examiner

*Primary Examiner* — Courtney Smith
*Assistant Examiner* — Jessey R Ervin
(74) *Attorney, Agent, or Firm* — Lewis Roca Rothgerber Christie LLP (57) ABSTRACT

A display apparatus includes a case having a foldable portion; a display panel including a first portion on a first side of the case, and a curved portion on a side surface of the case and a second side of the case that is different from the first side; a window film on the first portion of the display panel; and a cover window on the display panel and fixed to the case so as to cover the side surface of the case.

24 Claims, 6 Drawing Sheets

DISPLAY APPARATUS

CROSS-REFERENCE TO RELATED APPLICATION

This application claims priority to and the benefit of Korean Patent Application No. 10-2015-0095852, filed on Jul. 6, 2015 in the Korean Intellectual Property Office, the entire content of which is incorporated herein by reference.

BACKGROUND

1. Field

Aspects of embodiments relate to a display apparatus.

2. Description of the Related Art

Electronic devices based on mobility have come into widespread use. Recently, tablet personal computers (PCs), in addition to small electronic devices such as mobile phones, have been widely used as mobile electronic devices.

In order to support various functions, the mobile electronic devices include a display for providing a user with visual information such as images or videos. Recently, as components for driving such displays have become miniaturized, the occupancy of the displays in electronic devices has gradually been increasing. Moreover, a structure that may be curved to have a predetermined angle of curvature has been developed.

SUMMARY

One or more exemplary embodiments include a display apparatus.

Additional aspects and features will be set forth in part in the description which follows and, in part, will be apparent from the description, or may be learned by practice of the presented embodiments.

According to one or more exemplary embodiments, a display apparatus includes a case having a foldable portion; a display panel including a first portion on a first side of the case, and a curved portion on a side surface of the case and a second side of the case that is different from the first side; a window film on the first portion of the display panel; and a cover window on the display panel and fixed to the case so as to cover the side surface of the case.

The case may include case body portions separate from each other, and a connecting portion between the separate case body portions and connecting the case body portions to each other so as to be rotatable.

The display panel may include a substrate, an emission portion on the substrate, and a thin film encapsulation layer on the emission portion and blocking the emission portion from the outside.

The substrate may include polyimide.

An outer surface of the window film may be hard-coated.

The display apparatus may further include a cover on the window film and fixing the window film to the case.

The cover may include a first cover, and, in one embodiment, a second cover separate from the first cover.

The display apparatus may further include a circuit module connected to the display panel and arranged in the case.

The cover window may include a transparent material.

The cover window may include at least one of transparent synthetic resin, glass, and silicone.

The cover window may include a first cover window on the curved portion of the display panel that is on the side surface of the case, and a second cover window connected to the first cover window and facing the first cover window.

The first cover window may include a curved surface.

The cover window may further include a fixing portion connected to the first cover window and the second cover window and fixed to the case.

A portion of the cover window and a portion of the window film may overlap each other.

A portion of the cover window may be inserted in the case.

The display apparatus may further include an adhesive member between the window film and the display panel.

According to one or more exemplary embodiments, a display apparatus includes a case having a foldable portion; a display panel having a foldable portion on a side of the case, and a curved portion covering a side surface of the case; a window film on the foldable portion of the display panel; and a cover window fixed to the case so as to cover the curved portion of the display panel.

The display apparatus may further include a cover combined to the case and fixing the window film to the case.

The cover may fix a portion of the cover window.

The window film may protect the foldable portion of the display panel.

The display panel may be arranged on the case such that a portion of the display panel that displays an image is exposed to the outside.

The display panel may be flexible.

According to one or more exemplary embodiments, a display apparatus includes a case having a foldable portion; a display panel on the case; a window film on a portion of the display panel to which a compressive force is applied when the case is folded; and a cover window fixed to the case so as to cover a portion of the display panel to which a tensile force is applied.

BRIEF DESCRIPTION OF THE DRAWINGS

These and/or other aspects will become apparent and more readily appreciated from the following description of some exemplary embodiments, taken in conjunction with the accompanying drawings in which.

DETAILED DESCRIPTION

Reference will now be made in further detail to some exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first," "second," etc. may be used herein to describe various components, these components should not be limited by these terms. These components are merely used to distinguish one component from another.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings may be arbitrarily illustrated for convenience of explanation, the following embodiments are not limited thereby.

In the following examples, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When an embodiment may be implemented differently, a specific process order may be performed differently from the described order. For example, two consecutively described processes may be performed substantially at the same time or performed in an order opposite to the described order.

Figure 1A:
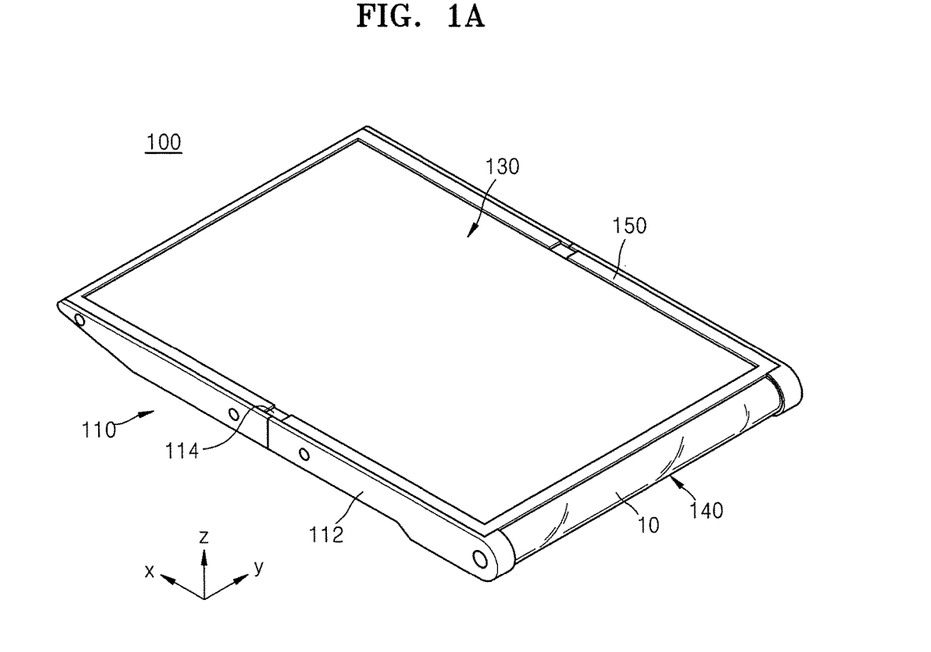
FIG. 1A is a top perspective view and FIG. 1B is a bottom perspective of a display apparatus according to an exemplary embodiment.
Figure 1B:
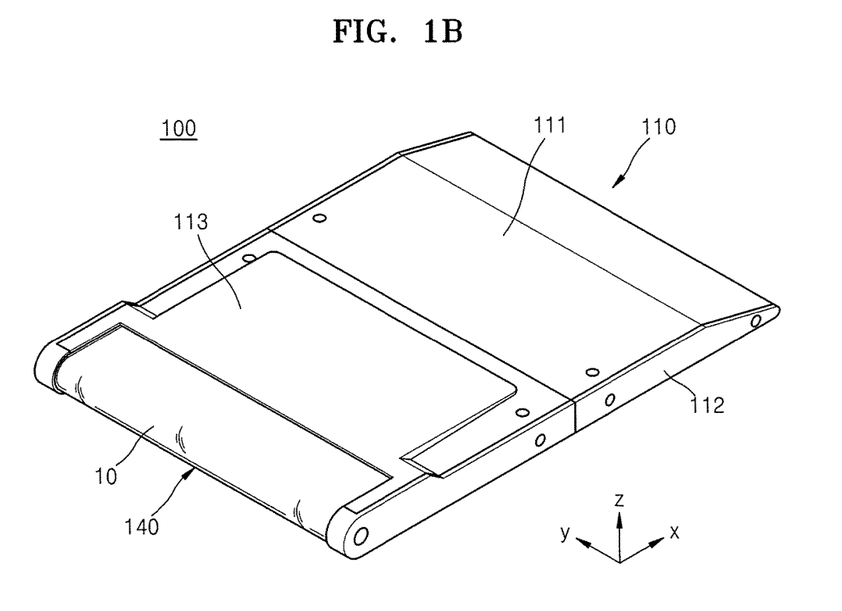
Figure 2:
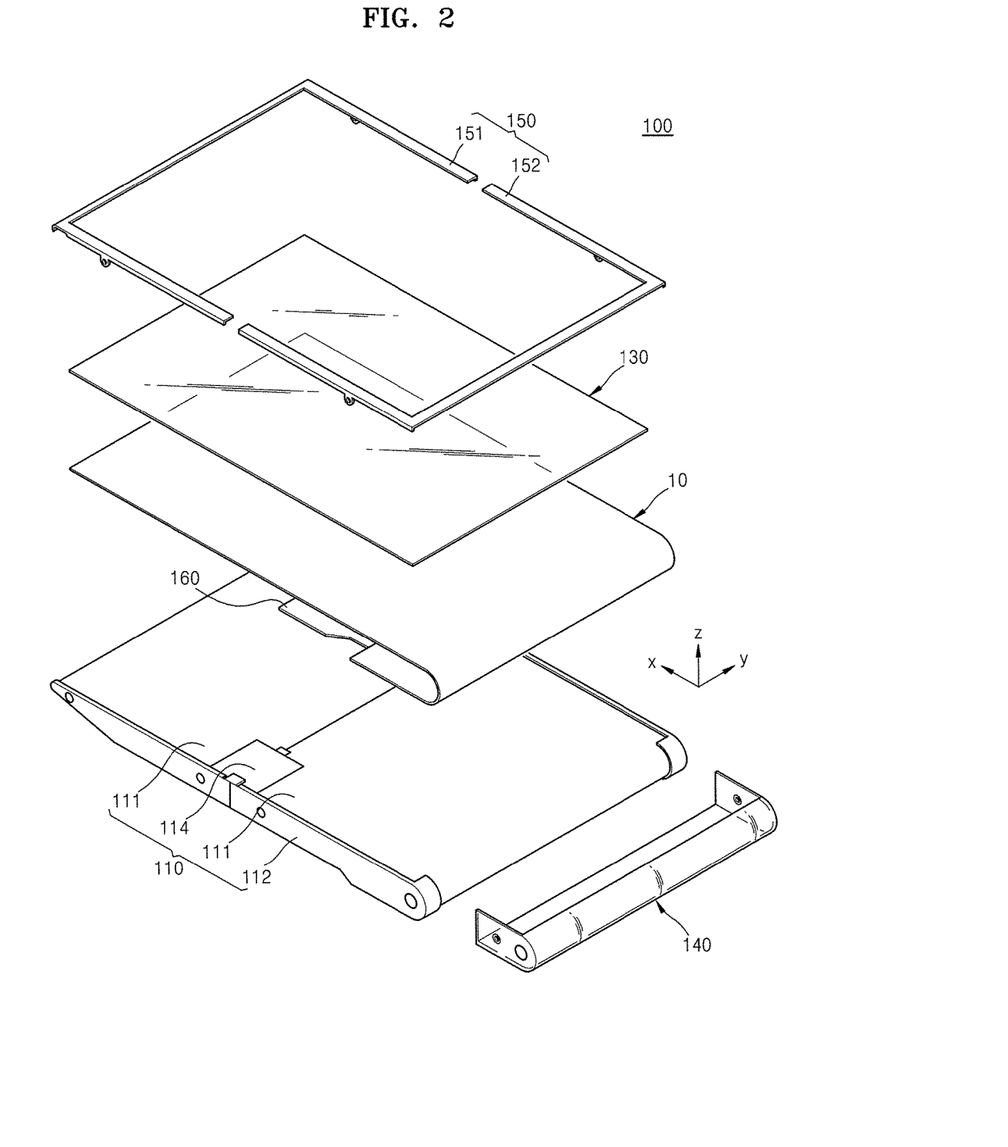
FIG. 2 is an exploded perspective view of the display apparatus of FIGS. 1A and 1B.
Figure 3:
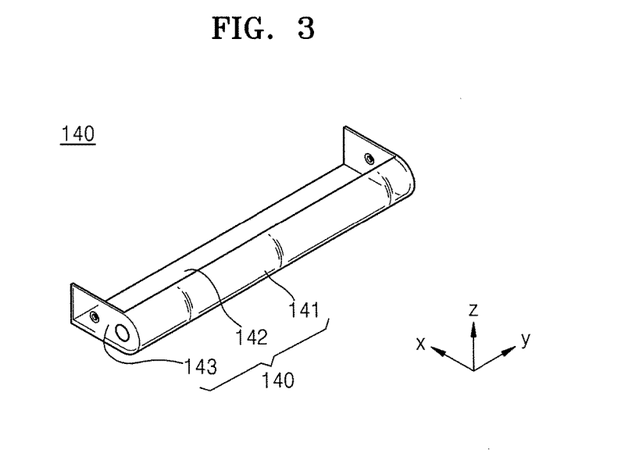
FIG. 3 is a perspective view of a cover window of the display apparatus of FIGS. 1A and 1B.

FIG. 1A is a top perspective view and FIG. 1B is a bottom perspective view of a display apparatus 100 according to an exemplary embodiment. FIG. 2 is an exploded perspective view of the display apparatus 100 of FIGS. 1A and 1B. FIG. 3 is a perspective view of a cover window 140 of the display apparatus 100 of FIGS. 1A and 1B.

Referring to FIGS. 1A to 3, the display apparatus 100 may include a case 110, a display panel 10, a window film 130, the cover window 140, a cover 150, and a circuit module 160.

The case 110, in one embodiment, may include a case body portion 111, a connecting portion 114, a first case cover 112, and a second case cover 113. In this regard, case body portions 111 may be separate from each other and may be connected to the connecting portion 114 and folded towards each other. Particularly, each of the case body portions 111 that are separate from each other may rotate only in one direction. A surface of the case body portions 111 that are foldable towards each other may be flat. In this regard, a portion of the display panel 10 may be placed on the surface of the case body portions 111.

A groove or the like may be formed in the case body portion 111 or in an outer surface of the case body portion 111 such that a battery (not shown) and the circuit module 160 may be inserted therein. In this regard, the battery (not shown) and the circuit module 160 may be covered by the second case cover 113 or the like so as to be prevented or substantially prevented from being exposed to the outside of the case body portion 111.

The connecting portion 114 may be disposed between the case body portions 111 separate from each other to connect the case body portions 111 to each other. In this regard, the connecting portion 114 may rotate each of the case body portions 111 only in one direction. The case body portions 111 may rotate on the connecting portion 114 in opposite directions. Accordingly, the case body portions 111 may rotate on the connecting portion 114 so as to become closer to each other and thus may be folded towards each other. Also, the case body portions 111 may rotate on the connecting portion 114 so as to form a flat surface.

The first case cover 112 may be disposed on a side surface of the case body portion 111 in a width direction of the case body portion 111. In this regard, the first case cover 112 may shield a portion of the cover window 140 and the like from the outside. The first case cover 112 may be provided in plural on both side surfaces of the case body portion 111 in the width direction of the case body portion 111.

The second case cover 113 may be combined with the case body portion 111, thereby covering the battery (not shown), the circuit module 160, or the like disposed in the case body portion 111. In one embodiment, the second case cover 113 may be detachably disposed, on a portion of the case body portion 111 where the display panel 10 is not disposed.

The display panel 10 may be disposed on a surface of the case 110. In this regard, the display panel 10 may be disposed in a length direction of the case 110. Also, the display panel 10 may be disposed to cover a side surface of the case 110 in the length direction of the case 110. The display panel 10 may be flexible.

A configuration of the display panel 10 will be described later below.

The window film 130 may be disposed on the display panel 10 disposed in the length direction of the case 110. Particularly, as the window film 130 is disposed on an upper surface of the case 110, the window film 130 may be disposed on the display panel 10.

The window film 130 may include a transparent material. In this regard, an outer surface of the window film 130 may be hard-coated. If a portion of the window film 130 is not hard-coated, it may be vulnerable to a tensile force. By contrast, a portion of the window film 130 that is hard-coated may endure a compressive force effectively.

The window film 130 may include a polymer material. For example, the window film 130 may include at least one of acrylic resin and silicon-based resin. Also, the window film 130 may include materials such as polyimide, polycarbonate, polyketylmethacrylate, polyethersulfone, polyamide, or polyamide-imide.

The window film 130 may be attached to the display panel 10 via an adhesive member (not shown) and fixed thereto. In this regard, the adhesive member (not shown) may include optical clear resin. However, the adhesive member (not shown) is not limited thereto, and may include any material including a light-transmissive material and attaching the display panel 10 and the window film 130 to each other. In some embodiments, the window film 130 and the display panel 10 may be fixed to each other by the cover 150. In this regard, the window film 130 and the display panel 10 may be fixed to each other by the cover 150 and the case 110 while the window film 130 and the display panel 10 are not adhered to each other. In some embodiments, the window film 130 and the display panel 10 may be fixed to each other by the adhesive member (not shown) and the cover 150. A case in which the window film 130 and the display panel 10 are fixed to each other by the adhesive member (not shown) and the cover 150 will be mainly described below for convenience of description.

The cover window 140 may be disposed on the side surface of the case 110 in the length direction of the case 110. In this regard, the cover window 140 may completely cover the side surface of the case 110. Also, the cover window 140 may completely cover the display panel 10 disposed on the side surface of the case 110.

The cover window 140 may be fixed to the case 110 by combination members, such as one or more of screws, bolts, or adhesive tape. A portion of the cover window 140 may be inserted into the case 110 and thus fixed to the case 110.

The cover window 140 may include a first cover window 141, a second cover window 142, and a fixing portion 143. In this regard, the first cover window 141 and the second cover window 142 may be connected to each other. Also, the fixing portion 143 may be connected to the first cover window 141 and the second cover window 142. Particularly, the first cover window 141, the second cover window 142, and the fixing portion 143 as described above may form one space.

The first cover window 141 may include a curved surface. That is, a cross-sectional area through a plane perpendicular to a length direction of the first cover window 141 may be curved. In one embodiment, the first cover window 141 may have a constant radius of curvature. Also, the first cover window 141 and the window film 130 may be disposed in various forms. In an embodiment, the first cover window 141 may be disposed to partially overlap the window film 130. Particularly, a portion of the first cover window 141 may be disposed on the window film 130. In some embodiments, the first cover window 141 and the window film 130 may be disposed such that an end of the first cover window 141 and an end of the window film 130 may be in contact with each other. A case in which the end of the first cover window 141 and the end of the window film 130 are disposed to face each other and thus contact each other will be mainly described below for convenience of description.

The second cover window 142 may be connected to the first cover window 141 and may form a flat surface. In this regard, the second cover window 142 may shield a portion of the display panel 10 from the outside. Also, the second cover window 142 may be disposed on a rear surface of the case 110 (or another surface of the case 110 that faces the surface of the case 110 on which the window film 130 is positioned).

The first cover window 141 and the second cover window 142 as described above may include a transparent material. In this regard, the transparent material may include at least one of transparent synthetic resin such as acryl or polyethylene terephthalate (PET), glass, and silicone. A case in which the first cover window 141 and the second cover window 142 include a transparent synthetic resin material will be mainly described below for convenience of description.

In an embodiment, the first cover window 141 and the second cover window 142 as described above may adhere to the display panel 10 and thus may be fixed thereto. In this regard, adhesive members may be respectively disposed between the first cover window 141 and the display panel 10 and between the second cover window 142 and the display panel 10. Particularly, the adhesive members as described above may include transparent materials. For example, the adhesive members as described above may be optical clear resin.

In some embodiments, the first cover window 141 and the second cover window 142 may be fixed to the case 110 via the fixing portion 143. In this regard, the first cover window 141 and the second cover window 142 may adhere to the display panel 10 by an adhesive or may not adhere to the display panel 10.

A case in which the first cover window 141 and the second cover window 142 are fixed to the case 110 via the fixing portion 143 will be mainly described below for convenience of description.

The fixing portion 143 may be inserted in a side surface of the case 110 in a width direction of the case 110. In one embodiment, the fixing portion 143 is disposed between the case body portion 111 and the second case cover 113 and combined to the case body portion 111 via a combination member, and the fixing portion 143 may not be exposed to the outside by the second case cover 113. In some embodiments, the fixing portion 143 may be disposed to be in contact with an outer surface of the second case cover 113 and combined to the second case cover 113 via an additional combination member. In this regard, the fixing portion 143 may be exposed to the outside. However, a case in which the fixing portion 143 is disposed between the case body portion 111 and the second case cover 113 and combined to the case body portion 111 via a combination member will be mainly described below for convenience of description.

The cover 150 may be disposed on the window film 130 to prevent or substantially prevent the display panel 10, the window film 130, and the cover window 140 from being misaligned with each other. In this regard, the cover 150 may include a first cover 151 and a second cover 152 separate from each other.

The first cover 151 may be disposed on the window film 130 and fixed to the case 110. In this regard, a portion where the above-described combination member may be inserted or disposed may be formed in the first cover 151, and such a portion may be inserted into the case 110 or may adhere to the outside of the case 110.

The first cover 151 may cover an edge of the window film 130. In this regard, the first cover 151 may completely cover a portion of an edge area of the window film 130 and apply force to the window film 130 and the display panel 10 along with the case 110 to fix the window film 130 and the display panel 10.

The second cover 152 may be disposed to face the first cover 151. In this regard, the second cover 152 may be disposed on the window film 130 in a similar manner to the first cover 151. The second cover 152 may be disposed to apply force to a portion of the cover window 140. For example, a portion of the second cover 152 may be disposed at a place where the window film 130 and the first cover window 141 meet each other. Particularly, a portion of the second cover 152 may be disposed to completely cover a boundary line at which an end of the window film 130 and an end of the first cover window 141 contact each other and thus may cover the end of the window film 130 and the end of the first cover window 141.

The circuit module 160 may be connected to the display panel 10. In this regard, the circuit module 160 may control the display panel 10. Also, the circuit module 160 may be inserted in the case 110. In this regard, a groove may be formed in the case body portion 111 so that the circuit module 160 may be placed therein, and the circuit module 160 may be blocked from the outside by the second case cover 113 disposed on the case body portion 111.

Besides the above-described configurations, the display apparatus 100 may include a main circuit module (not shown) and an acoustic emission portion (not shown), such as a speaker for emitting sound to the outside. In addition, the display apparatus 100 may include a device, such as a button (not shown), for receiving an input signal from a user. In this regard, besides the above-described cases, the display apparatus 100 may include all components used in an apparatus that is portable and may also display an image.

In a process of assembling the display apparatus 100 described above, the display panel 10 may be placed on the case body portion 111. In this regard, the case body portion 111 may have been assembled with the connecting portion 114.

The display panel 10 may be bent at a side of the case body portion 111, and, thus, a portion of the display panel 10 may be disposed on a rear surface of the case body portion 111. Particularly, the display panel 10 may be placed on the case body portion 111. In some embodiments, the display panel 10 may be placed on the case body portion 111 and fixed thereto by an additional adhesive member or the like. Also, the circuit module 160 may be connected to the portion of the display panel 10 disposed on the rear surface of the case body portion 111, and the circuit module 160 may be inserted in the case body portion 111.

The cover window 140 may be disposed on a bent portion of the display panel 10. In this regard, the window film 130 may be disposed along with the display panel 10 under a condition in which the window film 130 has been attached to the display panel 10. Particularly, an adhesive member (not shown) may be disposed on the window film 130 and the display panel 10 to attach the window film 130 and the display panel 10 to each other.

After the cover window 140 is disposed, the first cover 151 and the second cover 152 may be disposed on the window film 130 and assembled on the case body portion 111. Also, the first case cover 112 and the second case cover 113 may be combined to the case body portion 111. In this regard, the first case cover 112 and the second case cover 113 may be combined to the case body portion 111 by using one or more methods. For example, in an embodiment, protrusions extend from the first case cover 112 and the second case cover 113, grooves are formed in the case body portion 111, and the first and second case covers 112 and 113 and the case body portion 111 may combine with each other. In some embodiments, the first case cover 112 and the second case cover 113 may be combined to the case body portion 111 via an additional combination member.

In the case as described above, a portion of the first cover 151 and a portion of the second cover 152 may be disposed between the first case cover 112 and the case body portion 111. Also, the fixing portion 143 may be disposed between the first case cover 112 and the case body portion 111 under a condition in which the fixing portion 143 has been fixed to the case body portion 111. Accordingly, the display panel 10 may be fixed to the case body portion 111.

The display panel 10 will be described further below.

Figure 4:
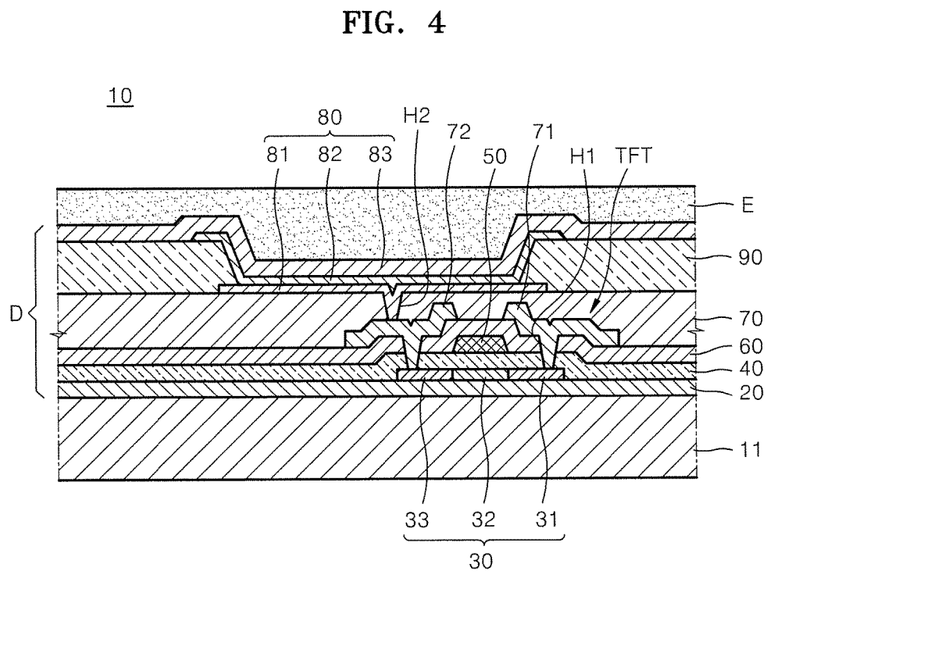
FIG. 4 is a cross-sectional view of a portion of a display panel of the display apparatus of FIGS. 1A and 1B.

FIG. 4 is a cross-sectional view of a portion of the display panel 10 of the display apparatus 100 of FIGS. 1A and 1B.

Referring to FIG. 4, the organic light-emitting display panel 10 may include a substrate 11 and an emission portion D. Also, the organic light-emitting display panel 10 may include a thin film encapsulation layer E on the emission portion D. In this regard, a plastic material may be used to form the substrate 11, or a metal material, such as SUS or Titanium (Ti), may be used to form the substrate 11. In one embodiment, polyimide (PI) may be used to form the substrate 11. A case in which PI is used to form the substrate 11 will be mainly described below for convenience of description.

The emission portion D may be formed on the substrate 11. In this regard, the emission portion D may include a thin film transistor TFT, a passivation layer 70 may be formed to cover the thin film transistor TFT, and an organic light-emitting device 80 may be formed on the passivation layer 70.

In one embodiment, a glass material may be used to form the substrate 11. However, a material of the substrate 11 is not limited thereto. A plastic material may be used to form the substrate 11, or a metal material, such as SUS or Ti, may be used to form the substrate 11. In one embodiment, PI may be used to form the substrate 11.

In one embodiment, a buffer layer 20 including an organic compound and/or an inorganic compound is formed on a top surface of the substrate 11 and may include $SiO_x$ ($x \geq 1$) or $SiN_x$ ($x \geq 1$).

An active layer 30 arranged in a pattern (e.g., a predetermined pattern) is formed on the buffer layer 20, and the active layer 30 is covered by a gate insulation layer 40. The active layer 30 has a source region 31 and a drain region 33 and further includes a channel region 32 between the source region 31 and the drain region 33.

The active layer 30 may include one or more materials. For example, the active layer 30 may include an inorganic semiconductor material, such as amorphous silicon or crystalline silicon. In some embodiments, the active layer 30 may include an oxide semiconductor. In some embodiments, the active layer 30 may include an organic semiconductor material. However, a case in which the active layer 30 includes amorphous silicon will be mainly described below for convenience of description.

The active layer 30 may be formed by forming an amorphous silicon film on the buffer layer 20, crystallizing the amorphous silicon film into a polycrystalline silicon film, and patterning the polycrystalline silicon film. The source region 31 and the drain region 33 of the active layer 30 are doped with impurities based on the type of thin film transistor, for example, a driving thin film transistor (not shown) or a switching thin film transistor (not shown).

A gate electrode 50 corresponding to the active layer 30 and an interlayer insulation layer 60 covering the gate electrode 50 are formed on a top surface of the gate insulation layer 40.

In addition, after a contact hole H1 is formed in the interlayer insulation layer 60 and the gate insulation layer 40, a source electrode 71 and a drain electrode 72 are formed on the interlayer insulation layer 60 to respectively contact the source region 31 and the drain region 33.

The passivation layer 70 is formed on top of the thin film transistor TFT, and a pixel electrode 81 of the organic light-emitting device 80 is formed on top of the passivation layer 70. The pixel electrode 81 contacts the drain electrode 72 of the thin film transistor TFT through a via hole H2 in the passivation layer 70. The passivation layer 70 may be formed as a planarization layer (i.e., an upper surface is flat regardless of bending of the lower layer) or formed to have bending depending on bending of a layer disposed in the lower portion of the display device. Also, the passivation layer 70 may include a transparent insulator to accomplish a resonance effect.

After the pixel electrode 81 is formed on the passivation layer 70, a pixel defining layer 90 including an organic material and/or an inorganic material is formed to cover the pixel electrode 81 and the passivation layer 70. An opening is formed in the pixel defining layer 90 to expose the pixel electrode 81.

Also, an intermediate layer 82 and an opposite electrode 83 are formed at least on the pixel electrode 81.

In one embodiment, the pixel electrode 81 serves as an anode and the opposite electrode 83 serves as a cathode; however, polarities of the pixel electrode 81 and the opposite electrode 83 may be reversed.

The pixel electrode 81 and the opposite electrode 83 are insulated from each other by the intermediate layer 82, and apply voltages having polarities different from each other to the intermediate layer 82 so that light is emitted in an organic emission layer.

The intermediate layer 82 may include the organic emission layer. In some embodiments, in addition to the organic emission layer, the intermediate layer 82 may further include at least one of a hole injection layer, a hole transport layer, an electron transport layer, and an electron injection layer. Exemplary embodiments are not limited thereto, and the intermediate layer 82 may include the organic emission layer and may further include one or more functional layers (not shown).

One unit pixel may include a plurality of sub-pixels, and the plurality of sub-pixels may emit light of various colors. For example, the sub-pixels may include sub-pixels respectively emitting light of red, green, and blue, or may include sub-pixels (not denoted) respectively emitting light of red, green, blue, and white.

The thin film encapsulation layer E described above may include a plurality of inorganic layers, or may include an inorganic layer and an organic layer.

The organic layer of the thin film encapsulation layer E includes a polymer and may be a single layer or a layer stack including any of polyethylene terephthalate, PI, polycarbonate, epoxy, polyethylene, and polyacrylate. For example, the organic layer may include polyacrylate and, in an embodiment, may include a polymerized monomer composition including diacrylate-based monomer and triacrylate-based monomer. The monomer composition may further include monoacrylate-based monomer. Also, the monomer composition may further include a well-known photoinitiator, such as trimethylbenzoyl diphenylphosphine oxide (TPO), but exemplary embodiments are not limited thereto.

The inorganic layer of the thin film encapsulation layer E may be a single layer or a layer stack including a metal oxide or a metal nitride. In an embodiment, the inorganic layer may include any of SiNx, $Al_2O_3$, $SiO_2$, and $TiO_2$.

The top layer of the thin film encapsulation layer E that is exposed to the outside may include an inorganic layer in order to prevent or substantially prevent intrusion of moisture into the organic light-emitting device 80.

In one or more embodiments, the thin film encapsulation layer E may include at least one sandwich structure in which at least one organic layer is disposed between at least two inorganic layers. In some embodiments, the thin film encapsulation layer E may include at least one sandwich structure in which at least one inorganic layer is disposed between at least two organic layers. In some embodiments, the thin film encapsulation layer E may include a sandwich structure in which at least one organic layer is disposed between at least two inorganic layers and a sandwich structure in which at least one inorganic layer is disposed between at least two organic layers.

The thin film encapsulation layer E may include a first inorganic layer, a first organic layer, and a second inorganic layer sequentially formed from the top of the organic light-emitting device 80.

In some embodiments, the thin film encapsulation layer E may include a first inorganic layer, a first organic layer, a second inorganic layer, a second organic layer, and a third inorganic layer sequentially formed from the top of the organic light-emitting device 80.

In some embodiments, the thin film encapsulation layer E may include a first inorganic layer, a first organic layer, a second inorganic layer, a second organic layer, a third inorganic layer, a third organic layer, and a fourth inorganic layer sequentially formed from the top of the organic light-emitting device 80.

A halogenized metal layer including lithium fluoride (LiF) may be additionally included between the organic light-emitting device 80 and the first inorganic layer. The halogenized metal layer may prevent or substantially prevent the organic light-emitting device 80 from being damaged when the first inorganic layer is formed by using a sputtering method.

The first organic layer may have a smaller area than that of the second inorganic layer, and the second organic layer may have a smaller area than that of the third inorganic layer.

Figure 5:
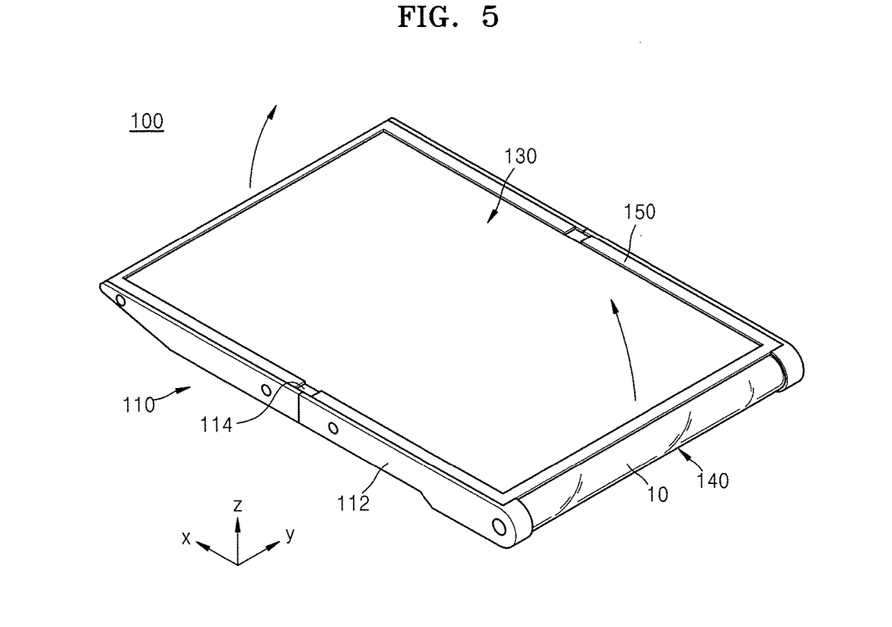
FIG. 5 is an operation diagram illustrating operation status of the display apparatus of FIGS. 1A and 1B, shown in an unfolded state.
Figure 6:
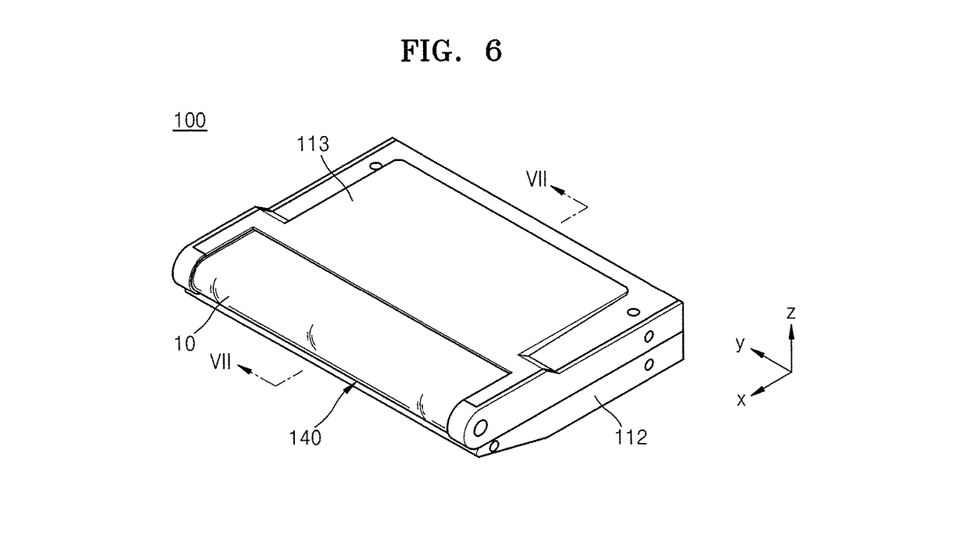
FIG. 6 is an operation diagram illustrating operation status of the display apparatus of FIGS. 1A and 1B, shown in a folded state.
Figure 7:
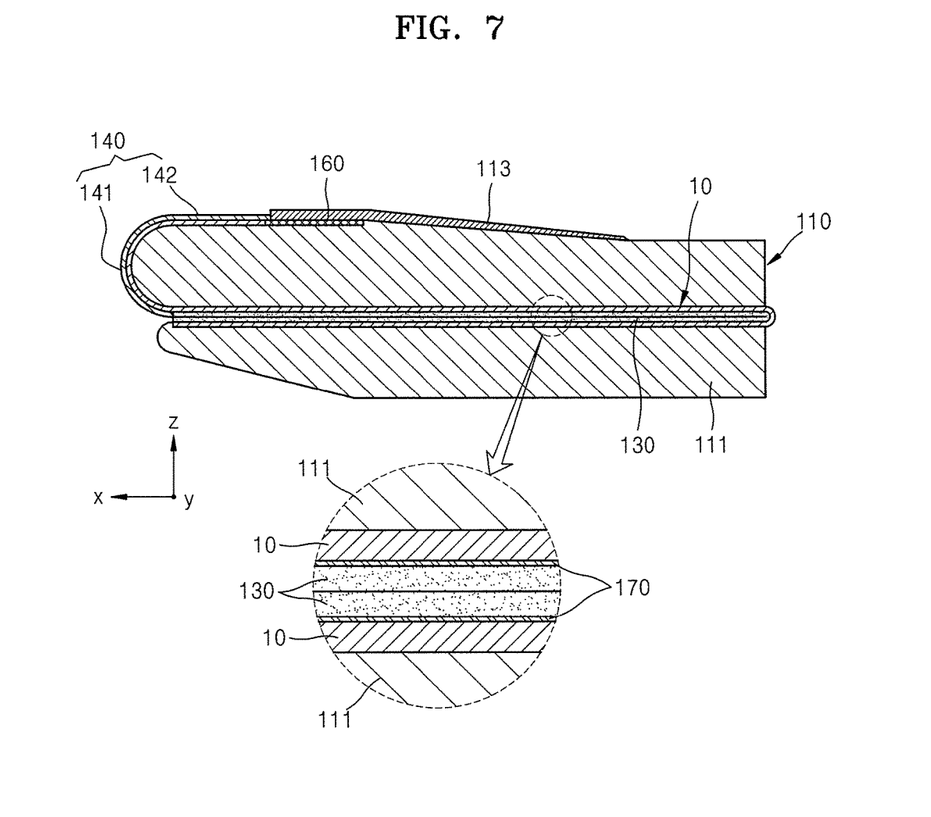
FIG. 7 is a cross-sectional view taken along the line VII-VII of FIG. 6.

FIG. 5 is an operation diagram illustrating an operation status of the display apparatus 100 of FIGS. 1A and 1B, shown in an unfolded state. FIG. 6 is an operation diagram illustrating an operation status of the display apparatus 100 of FIGS. 1A and 1B, shown in a folded state. FIG. 7 is a cross-sectional view taken along line VII-VII of FIG. 6.

Referring to FIGS. 5 to 7, the display apparatus 100 may be portable. In this regard, the display apparatus 100 may be folded about the connecting portion 114. In an embodiment, when the user uses the display apparatus 100 while carrying the display apparatus 100, the display panel 10 may be spread, or unfolded, as shown in FIG. 5. In this regard, the case body portions 111 may be spread as a whole as the case body portions 111 become farther from each other about the connecting portion 114. Particularly, when the case body portions 111 are completely spread apart as a whole, the case body portions 111 form an angle of 180 degrees, thereby forming a flat display panel 10.

After the display panel 10 spreads completely as described above, an image may be displayed on the display panel 10. In this regard, the image may be displayed by using one or more methods. For example, when the display panel 10 that is folded is spread to a certain angle (e.g., a predetermined angle) or more, the image may be displayed. In some embodiments, when a signal is input via an input button or the like, the image may be displayed.

Once use of the display apparatus 100 is complete, the case body portions 111 may be rotated on the connecting portion 114 again such that the display apparatus 100 may be folded as shown in FIG. 6. In this regard, the case body portions 111 may rotate on the connecting portion 114 so as to become closer to each other, and portions of the display panel 10 may overlap each other. In such a case, portions of the window film 130 attached to the display panel 10 via an adhesive member 170, as described above, may contact each other. In this regard, a compressive force may be applied to a folded portion of the window film 130.

Another portion of the display panel 10 disposed over a side surface and a rear surface of the case body portion 111 may be exposed or visible to the outside in both unfolded and folded states. In this regard, this portion of the display panel 10 may selectively display an image. For example, this portion of the display panel 10 may display an image only when the case body portions 111 are folded towards each other. In one embodiment, the image may be displayed only for a certain time period.

As described above, the portion of the display panel 10 disposed on the side surface of the case body portion 111 may have a curved shape and thus may receive a tensile force. In this regard, when the window film 130 is disposed on the other portion of the display panel 10 disposed on the side surface of the case body portion 111, a hard-coated portion of the window film 130 may have cracks. Particularly, the hard-coated portion of the window film 130 may be resistant to a compressive force but vulnerable to the tensile force. In this regard, the window film 130 may be used for a foldable region of the display panel 10 to which a compressive force is applied, thereby reducing a thickness of the display panel 10. Also, the cover window 140 may be disposed in a curved region of the display panel 10 to which a tensile force is applied, thereby protecting the display panel 10.

Accordingly, the display apparatus 100 may effectively protect the display panel 10. Also, the display apparatus 100 exposes a portion of the display panel 10 to the outside and thus enables the user to obtain various information without seeing the entire display panel 10.

As the display apparatus 100 is foldable, the user may carry the display apparatus 100 and, thus, user convenience may be increased. Also, as the window film 130 is used for the display apparatus 100, weight of the display apparatus 100 may be decreased, and thickness of the display apparatus 100 may be reduced.

According to one or more exemplary embodiments, a display apparatus may have a longer life.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and equivalents thereof.

What is claimed is:

1. A display apparatus comprising:
    a case having a foldable portion;
    a display panel comprising a first portion on a first side of the case, and a curved portion on a side surface of the case and a second side of the case that is different from the first side, the curved portion being curved about an axis extending in a width direction;
    a window film on the first portion of the display panel; and
    a cover window on the display panel and fixed to the case so as to cover the curved portion and a portion of the first portion of the display panel, the cover window being spaced apart in a length direction from the foldable portion,
    wherein a portion of the cover window on the curved portion of the display panel that is on the side surface of the case is curved about an axis extending in the width direction so as to be round.
2. The display apparatus of claim 1, wherein the case comprises:
    case body portions separate from each other; and
    a connecting portion between the separate case body portions and connecting the case body portions to each other so as to be rotatable.
3. The display apparatus of claim 1, wherein the display panel comprises:
    a substrate;
    an emission portion on the substrate; and
    a thin film encapsulation layer on the emission portion and blocking the emission portion from the outside.
4. The display apparatus of claim 3, wherein the substrate comprises polyimide.
5. The display apparatus of claim 1, wherein an outer surface of the window film is hard-coated.
6. The display apparatus of claim 1, further comprising a cover on the window film and fixing the window film to the case.
7. The display apparatus of claim 6, wherein the cover comprises:
    a first cover; and
    a second cover separate from the first cover.
8. The display apparatus of claim 1, further comprising a circuit module connected to the display panel and arranged in the case.
9. The display apparatus of claim 1, wherein the cover window comprises a transparent material.
10. The display apparatus of claim 9, wherein the cover window comprises at least one of transparent synthetic resin, glass, and silicone.
11. The display apparatus of claim 1, wherein the cover window comprises:
    a first cover window on the curved portion of the display panel that is on the side surface of the case; and
    a second cover window connected to the first cover window and facing the first cover window.
12. The display apparatus of claim 11, wherein the first cover window comprises a curved surface.
13. The display apparatus of claim 11, wherein the cover window further comprises a fixing portion connected to the first cover window and the second cover window and fixed to the case.
14. The display apparatus of claim 1, wherein a portion of the cover window and a portion of the window film overlap each other.
15. The display apparatus of claim 1, wherein a portion of the cover window is inserted in the case.
16. The display apparatus of claim 1, further comprising an adhesive member between the window film and the display panel.
17. A display apparatus comprising:
    a case having a foldable portion;
    a display panel having a foldable portion on a side of the case, and a curved portion covering a side surface of the case;
    a window film on the foldable portion of the display panel; and
    a cover window fixed to the case so as to cover the curved portion of the display panel, the cover window being spaced apart in a length direction from the foldable portion,
    wherein a portion of the cover window on the curved portion of the display panel that is on the side surface of the case is round.
18. The display apparatus of claim 17, further comprising a cover combined to the case and fixing the window film to the case.
19. The display apparatus of claim 18, wherein the cover fixes a portion of the cover window.

20. The display apparatus of claim 17, wherein the window film protects the foldable portion of the display panel.

21. The display apparatus of claim 17, wherein the display panel is arranged on the case such that a portion of the display panel that displays an image is exposed to the outside.

22. The display apparatus of claim 17, wherein the display panel is flexible.

23. A display apparatus comprising:
a case having a foldable portion;
a display panel on the case;
a window film on a portion of the display panel to which a compressive force is applied when the case is folded; and
a cover window fixed to the case so as to cover a portion of the display panel to which a tensile force is applied, the cover window being spaced apart in a length direction from the foldable portion,
wherein the portion of the display panel to which the tensile force is applied and a portion of the cover window on the portion of the display panel to which the tensile force is applied are round.

24. A display apparatus comprising:
a case having a foldable portion;
a display panel comprising a first portion on a first side of the case, and a curved portion on a side surface of the case and a second side of the case that is different from the first side, the side surface of the case being spaced apart in a length direction from the foldable portion, the curved portion of the display panel being visible to an outside of the case to display an image in both unfolded and folded states of the case;
a window film on the first portion of the display panel; and
a cover window on the display panel and fixed to the case so as to cover the side surface of the case, the cover window being spaced apart in the length direction from the foldable portion.

* * * * *